(12) United States Patent
Blair

(10) Patent No.: US 11,332,607 B2
(45) Date of Patent: May 17, 2022

(54) EPOXY RESIN FORMULATIONS

(71) Applicant: HEXCEL COMPOSITES LIMITED, Duxford (GB)

(72) Inventor: Dana Blair, Cambridge (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 0 days.

(21) Appl. No.: 15/734,008

(22) PCT Filed: Jun. 13, 2019

(86) PCT No.: PCT/EP2019/065596
§ 371 (c)(1),
(2) Date: Dec. 1, 2020

(87) PCT Pub. No.: WO2019/238880
PCT Pub. Date: Dec. 19, 2019

(65) Prior Publication Data
US 2021/0214550 A1  Jul. 15, 2021

(30) Foreign Application Priority Data

Jun. 15, 2018 (GB) ..................................... 1809830

(51) Int. Cl.

| | | |
|---|---|---|
| *C08J 5/24* | (2006.01) | |
| *C08L 63/04* | (2006.01) | |
| *C08L 63/02* | (2006.01) | |
| *C08L 63/00* | (2006.01) | |
| *C08G 59/38* | (2006.01) | |
| *C08G 59/24* | (2006.01) | |
| *C08G 59/30* | (2006.01) | |
| *C08G 59/40* | (2006.01) | |
| *C08J 5/04* | (2006.01) | |
| *C08K 3/02* | (2006.01) | |
| *C08K 3/22* | (2006.01) | |
| *C08K 3/32* | (2006.01) | |
| *C08K 5/3492* | (2006.01) | |
| *C08K 5/52* | (2006.01) | |

(52) U.S. Cl.
CPC ............ *C08L 63/04* (2013.01); *C08G 59/245* (2013.01); *C08G 59/308* (2013.01); *C08G 59/4021* (2013.01); *C08G 59/4035* (2013.01); *C08J 5/042* (2013.01); *C08J 5/24* (2013.01); *C08K 3/02* (2013.01); *C08K 3/2279* (2013.01); *C08K 3/32* (2013.01); *C08K 5/34922* (2013.01); *C08K 5/5205* (2013.01); *C08K 2003/026* (2013.01); *C08K 2003/323* (2013.01); *C08L 2201/02* (2013.01)

(58) Field of Classification Search
None
See application file for complete search history.

(56) References Cited

U.S. PATENT DOCUMENTS

2003/0158337 A1\* 8/2003 Choate .................... C08L 61/26
                                                                    525/107

FOREIGN PATENT DOCUMENTS

| CN | 106398110 A | 2/2017 | |
|---|---|---|---|
| EP | 0855421 A1 | 7/1998 | |
| GB | 1000633 A * | 8/1965 | ........... B32B 17/067 |
| WO | 2011/015611 A1 | 2/2011 | |
| WO | 2014/125044 A1 | 8/2014 | |

OTHER PUBLICATIONS

International Search Report (ISR) & Written Opinion (WO) issued in the parent Patent Cooperation Treaty (PCT), Application No. PCT/EP2019/065596, dated Sep. 26, 2019.

\* cited by examiner

*Primary Examiner* — Michael J Feely
(74) *Attorney, Agent, or Firm* — W. Mark Bielawski

(57) ABSTRACT

Formulations comprising from 10 to 80% by weight of the formulation of a halogenated epoxy resin; from 1 to 15% by weight of the formulation of an antimony based fire retardant; from 1 to 10% by weight of the formulation of an inorganic or non-polymeric organic phosphorous containing fire retardant; and from 1 to 30% by weight of the formulation of a curative system are provided. The formulations are particularly suitable for producing aircraft interior composite components having good fire retarding properties, low smoke emission, low smoke toxicity and low heat release properties. The formulations also have excellent processing and mechanical properties. Further components may be included in the compositions to improve various properties, including the fire retarding, low smoke emission, low smoke toxicity and low heat release properties and to also further improve the processing and mechanical properties, including toughness. Compositions produced from the formulations have excellent processing and mechanical properties, and may also have good surface finishes.

5 Claims, No Drawings

EPOXY RESIN FORMULATIONS

The present invention relates to improved epoxy resin formulations and in particular to epoxy resin formulations that can be used for the production of aircraft interior components having good fire retarding properties, low smoke emission, low smoke toxicity and low heat release properties whilst retaining good mechanical and processing properties. The invention also relates to prepregs containing the resin formulations, the cured prepregs, laminar structures formed from such cured prepregs, and aircraft components formed from such cured prepegs/laminar structures, particularly interior aircraft components, such as galleys, monuments, bins, floor components, cockpit components, trays, air ducts, seats or seat components.

A fibrous layer impregnated with a curable resin is known herein as a prepreg, and the resin in the prepreg may be uncured or partially cured.

For many years, prepregs comprising phenolic resin based formulations and glass fibre have been used to produce aircraft interior components, and such prepregs generally produce components having reasonable fire retarding, smoke emission and smoke toxicity (FST) properties. However, such phenolic resin based formulations produce components having generally poor surface finishes, and therefore, for uses in which the surface finish is important (such as aircraft interior components), the components require additional post-curing processing and/or the use of fillers to obtain acceptable surface finishes. The mechanical properties of such components may also be limited, and the weight of the components may be relatively high, particularly when the prepregs comprise glass rather than carbon fibre.

There has therefore been a shift towards the use of epoxy resin based prepregs for forming aircraft interior components, as such resins can produce components with improved surface finishes, and also potentially improved mechanical properties, compared to phenolic resin based systems.

Epoxy resin formulations typically contain epoxy resins, which may be selected from a wide range of epoxy containing materials according to the cure cycle to be employed and the nature of the finished article to be produced. Epoxy resins can be solid, liquid or semi-solid and are characterised by their functionality and epoxy equivalent weight. The functionality of an epoxy resin is the number of reactive epoxy sites per molecule that are available to react and cure to form the cured structure. For example, a bisphenol-A epoxy resin has a functionality of 2, and certain glycidyl amines can have a functionality of more than 4. The reactivity of an epoxy resin is indicated by its epoxy equivalent weight (EEW), the lower the EEW the higher the reactivity. The EEW is the weight of epoxy resin material in grams containing 1 mole equivalent of epoxide groups (g/mol).

Epoxy formulations also include catalysts and/or curatives, and these are also selected according to the nature of the epoxy resin, the product to be produced and the cure cycle that is required.

Cured epoxy resin systems can be brittle, and it is well known to include tougheners in the epoxy resin systems in order to reduce their brittleness. Typical tougheners that have been proposed are thermoplastic resins such as polyvinyl formal and phenoxy resins, rubbers such as carboxyl-terminated butadiene rubber (CBTN) and amine-terminated acrylonitrile rubber (ATBN), and thermoplastics such as polyether sulphone.

The properties required of a prepreg are that when cured it has the required Tg and also has the required mechanical properties according to the use to which it is to be put. In certain applications it is important that the Tg is retained under damp or humid conditions. Additionally, when used in the production of laminar structures it must adhere to the adjacent layers in the laminate, and for this use it is preferred that the prepreg is tacky to the touch, the tackiness being provided by the resin formulation.

Important physical properties for cured composite materials include interlaminar shear strength (ILSS), 0° flexural strength, 0° flexural modulus, 0° tensile strength and 0° tensile modulus; and these values are all influences by both the nature and amount of resin and non resin components present in the uncured composition.

Other important properties of the resin formulation and the cured prepreg are cold storage, shelf life and retention of physical and mechanical properties under humid conditions. The cured prepreg-based composite must have the desired drum peel properties (self-adhesion) to ensure strong bonding to core materials such as honeycomb core.

Cold storage is indicated by the retention of inter-laminar shear stress at −18° C. according to DIN EN2563 of up to 12 months, together with a retention of glass transition temperature as measured according to DIN EN6041. The resin formulation must additionally have a shelf life to enable storage prior to use. Typically, the resin should retain its properties for at least 15 days when stored at about 20° C. at a relative humidity of 65%.

In some cases it may also be useful for resin formulations to have relatively low viscosities at elevated temperatures, for example to promote resin flow during curing.

In addition to these physical property requirements for the resin and prepregs containing the resin formulation, it is important that the resin formulation satisfy certain processing requirements. For example it should not have too great an exotherm during curing as indicated by DSC measurements according to DIN EN 6045, typically the exotherm should be no greater than 450 Joules per gram of the resin. The resin formulation is preferably curable at a temperature between 120° C. and 160° C., preferably between 130° C. and 160° C. within 45 minutes in an autoclave, closed mould or an oven. These properties can be accomplished by the selection of the functionality and the EEW of the formulation together with the selection of the curative system. In some cases aircraft manufacturers prefer to cure at relatively higher temperatures for the shortest possible time because it reduces energy costs and reduces processing time in a press moulding process. Another desired cure procedure is known as hot-load/hot-unload curing, in which a prepreg is placed in a pre-heated mould, cured for a relatively short period, and removed from the mould without a cooling period, The level of FST properties required for aircraft components, particularly interior components, has increased considerably with greater safety requirements, and such components are also now required to have good heat release properties, for example to comply with the OSU (Ohio state University) heat release test (FAR 25.853 (d) Amdt. 20 App. F Pt. IV (e) and (g)), vertical burn test (FAR 25.853 Amdt. 20 APP. F Pt I (a)), and smoke density and toxic gases test (ABD0031 Iss/F D6-51377 REVG).

In general, prepregs comprising epoxy resin based formulations do not have as good FST and/or heat release properties (OSU) as prepregs comprising phenolic resin based formulations, particularly when the fibre component of the prepreg is carbon fibre, and efforts have been made to improve the FST/OSU properties of such epoxy resin based formulations. Epoxy resin based formulations and prepregs having improved FST/OSU properties are sometimes referred to as flame retardant resins or prepregs.

Flame retardant epoxy resins and prepregs in which the resin matrix is a flame retardant epoxy resin are known, for example from US2012/0164373, US2008/0315164 and WO 2008/136096. Many of these references are concerned with prepregs for use in electrical applications, such as circuit boards and electrical installations. US2008/0315164 discloses prepregs which exhibit excellent flame retardant properties and also maintain desired mechanical properties for applications in articles such as vehicle interiors, ceilings, partitions, walls etc. The materials are shown to satisfy the flammability requirement VO in the UL94 flammability test. US 2008/0315164 is, however, not concerned with the provision of materials that satisfy the stringent requirements for use in aircraft applications.

GB2472423 discloses fire retardant composite materials. Disclosed in the example is a prepreg with a dicyandiamide curative and a urone accelerator in combination with an imidazole catalyst. This document does not disclose any mechanical properties of the resin, or its cure properties. This document also fails to disclose actual formulations, and none of the performance properties are supported by data of actual formulations.

WO 2014/125044 discloses epoxy formulations comprising a polyfunctional epoxy resin, a phenoxy resin, a fire retardant, a toughener and a curative, and also their use in prepregs which are useful in the production of aircraft components, particularly interior and external panels and sleeves for helicopter rotor blades.

Whilst the above formulations have improved FST properties compared to non-modified resins, they do not necessarily meet the particularly high standards now required for aircraft interior components, particularly with respect to heat release, vertical burn and/or smoke/toxicity. It has also been difficult to maintain good mechanical and/or processing properties in resin formulations whilst improving FST properties.

The present invention aims to obviate or at least mitigate the above described problems and/or to provide improvements generally.

According to the invention there is provided a formulation, the use of the formulation, a prepreg, a laminar structure, the use of the laminar structure and an aircraft component according to any of the accompanying claims.

The present invention provides a formulation comprising:
a. from 10 to 80% by weight of the formulation of a halogenated epoxy resin;
b. from 1 to 15% by weight of the formulation of an antimony based fire retardant;
c. from 1 to 10% by weight of the composition of an inorganic or non-polymeric organic phosphorous containing fire retardant; and
d. from 1 to 30% by weight of the formulation of a curative system.

The present further provides the use of a formulation according to the present invention as a matrix in a prepreg.

The present invention also provides a prepreg comprising reinforcement fibres and a formulation according to the present invention.

The present invention further provides a laminar structure comprising one or more layers of a cured prepreg according to the present invention, optionally further comprising one or more layers of other materials; and the use of such a laminar structure as a component in an aircraft.

The present invention further provides an aircraft component comprising a cured prepreg in which the matrix for the prepreg comprises a formulation according to the present invention.

We have found that prepregs comprising formulations according to the present invention as the matrix thereof, laminar structures formed by curing such prepregs, and aircraft components formed from such cured prepregs/laminar structures have excellent fire retarding, low smoke emission and low smoke toxicity (FST) properties, as well as low heat release (OHU) properties, good surface finish and excellent mechanical and processing properties.

In particularly preferred embodiments of the present invention the formulations and prepregs of the invention provide laminar structures and components that can pass industry standard tests for low smoke emission, low smoke toxicity (FST) and low heat release (OHU) properties at resin loadings of up to 36%, preferably 39% or higher, and at thicknesses of 5 mm or more. Similarly, the laminar structures and components of the present invention, i.e. formed from the resin formulations and prepregs of the invention, have excellent interlaminar shear strength, 0° flexural strength, 0° flexural modulus, 0° tensile strength and 0° tensile modulus. The resin formulations and prepregs of the present invention also have excellent viscosity, tack, and curing properties and high cured Tgs.

By a halogenated epoxy resin we mean a halogen-containing epoxy resin material, particularly a chlorinated or brominated epoxy resin or mixtures thereof, preferably wherein the halogenated epoxy resin comprises a chlorinated epoxy resin, such as bisphenol-C epoxy resin.

Preferably, the formulations of the present invention comprise from 15 to 60% by weight of the formulation of the halogenated epoxy resin, more preferably from 15 to 40% by weight of the formulation.

The antimony based fire retardant components of the formulations according to the present invention preferably comprise antimony trioxide, antimony pentoxide or mixtures thereof. Preferably, the formulations of the present invention comprise from 1.5 to 12% by weight of the formulation of the antimony based fire retardant, more preferably from 2 to 10% by weight of the formulation.

The inorganic or non-polymeric organic phosphorous containing fire retardant components of the formulations according to the present invention preferably comprise red phosphorous, an ammonium polyphosphate, a polyphosphazene, a melamine phosphate (including polyphosphates and pyrophosphates) or mixtures thereof; more preferably the inorganic phosphorous containing fire retardant comprises red phosphorous. Particularly suitable forms of red phosphorous for use in the formulations of the present invention are blends of micro encapsulated red phosphorous in an epoxy resin carrier, such as Exolit RP 6500, available from Clariant International Ltd. The references to the amounts of inorganic phosphorous containing fire retardant used in the formulations of the present invention refer only to the amount of the inorganic phosphorous containing fire retardant itself, and not to any carrier or other components. Thus, if a formulation of the present invention is produced by incorporating therein 8% by weight of the formulation of component comprising a mixture of 50 wt % red phosphorous and 50 wt % epoxy resin, the amount of the inorganic phosphorous containing fire retardant in the formulation will be 4% by weight of the formulation. Preferably the formulations according to the present invention comprise from 1.5 to 7.5% by weight of the composition of the inorganic phosphorous containing fire retardant, more preferably from 2.5 to 6% by weight of the composition.

The curative system used in the formulations of the present invention assists the curing of the formulations by crosslinking of the halogenated epoxy resin and any other epoxy resin groups, and other ingredients in the formulation. By a curative system is meant any component or combination of components that enables curing of the formulations. Curative systems for use in the present invention may therefore comprise any curing agent or agents capable of causing the resin components of the formulation to cure, and may also include additional curing components such as co-curatives or accelerators, i.e. components that enhance the performance of the curing agent or agents. The combination of all curing agents and any additional curing additives is referred to collectively as the curative system, and the weight percent of the curative system in the formulation is therefore the sum of all curing agents and additional curing additives, such as accelerators. The amount of the curative system in the formulations of the present invention is from 1 to 30% by weight of the formulation, preferably from 3 to 20% and more preferably from 5 to 15%.

The curing agents used in the curative systems of the formulations of the present invention may be any agents capable of causing the resin components of the formulation to cure under appropriate conditions, for example aliphatic or aromatic amines, such as dicyandiamides, or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), hydrazides, sulfonamides, sulfones such as diamino diphenyl sulfone, anhydrides, mercaptans, imidazoles, ureas, tertiary amines, BF3 complexes or mixtures thereof.

Preferred curing agents include hydrazides and dicyandiamides.

Suitable hydrazides include, but are not limited to, 2,4-dihydroybenzoic acid hydrazide, oxalyl dihydrazide, 4-amino benzoic hydrazide, isophthalic dihydrazide, sebastic acid dihydrazide, adipic acid dihydrazide, icosanedioic acid dihydrazide, succinic dihydrazide, 3-fluorobenzoic hydrazide, valine dihydrazide, toluene sulphonic acid and 2-furoic hydrazide, and a particularly preferred curing agent is adipic acid dihydrazide.

Dicyandiamide is also a preferred curing agent for use in the curative systems of the formulations of the present invention.

In preferred embodiments of the present invention, the curative system further comprises an accelerator for the curative system. In such embodiments, any accelerator compatible with the curing agent or agents of the curative system may be used, but urea based accelerators are preferred. The urea accelerator may comprise a bis urea curing agent, such as 2,4 toluene bis dimethyl urea or 2,6 toluene bis dimethyl urea, 4,4'-Methylene bis (phenyl dimethyl urea) and/or combinations of the aforesaid curing agents. Urea based accelerators may also be referred to as "urones".

Other suitable urea based accelerators may comprise any of the following either alone or in any combination:

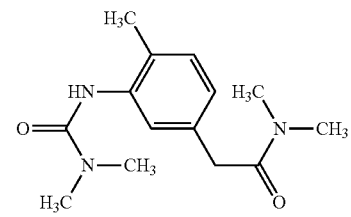

3,3'-(4-Methyl-1,3-phenylene)bis(1,1-dimethylurea)

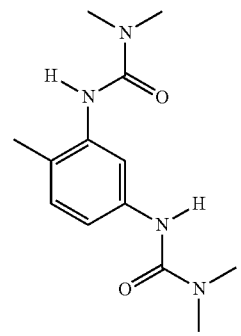

2,4' Toluene Bis Dimethyl Urea

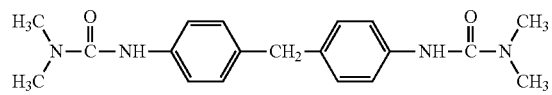

4,4-methylene diphenylene bis(N,N-dimethyl urea)

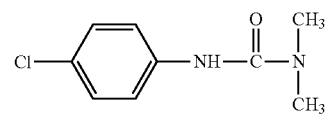

1,1-dimethyl, 3-(4-chlorophenyl)urea

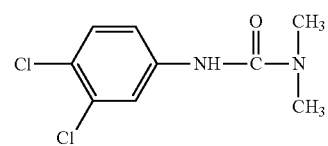

1,1-dimethyl, 3-(3,4-chlorophenyl)urea

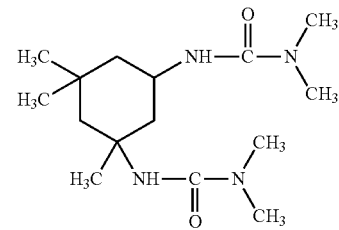

Isophorone bisdimethyl urea

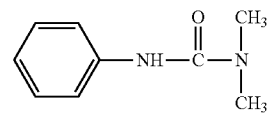

1,1-dimethyl, 3-phenyl urea

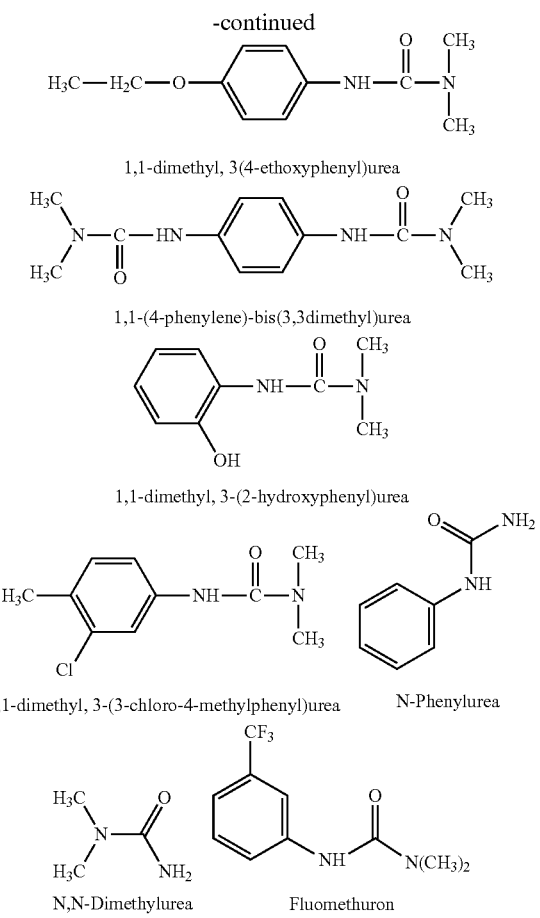

Preferred urea based materials are the range of materials available under the commercial name DYHARD® the trademark of Alzchem, which include bis ureas such as UR505, UR500 and Omicure U52M.

In a preferred embodiment of the present invention, the formulations of the present invention further comprise an organic polymeric or oligomeric phosphorous containing fire retardant. Preferably the organic polymeric or oligomeric phosphorous containing fire retardant is a phosphonate, more preferably a reactive phosphonate, particularly a phosphonate comprising phenol hydroxyl end groups. Examples of suitable polymeric or oligomeric phosphorous containing fire retardants for use in the present invention include Nofia OL3001 and Nofia OL1001, poly[phosphonate-co-carbonate] FRX CO35 and FRX CO60, available from FRX Polymers Inc, USA; oligomeric phosphonate polyol Exolit OP 560, from Clariant; poly(1,3-phenylene phenylphosphonate), and resorcinol bis-diphenylphosphate Fryoflex RDP, from ICL Industrial Products.

Preferably, the formulations of the present invention comprise from 4 to 35% by weight of the composition of an organic polymeric or oligomeric phosphorous containing fire retardant, more preferably from 5 to 30% by weight of the formulation, and most preferably from 5 to 25% by weight of the formulation.

In a further preferred embodiment of the present invention, the formulations of the present invention further comprise a smoke suppressant. A smoke suppressant is any material capable of suppressing the generation of smoke during the burning of components formed from the cured formulations of the present invention. Particularly suitable smoke suppressants for use in the formulations of the present invention include boron compounds, zinc compounds, metallic hydroxides or mixtures thereof. Particularly suitable smoke suppressants include zinc borate, zinc stannate, zinc hydroxystannate, magnesium hydroxide, calcium carbonate or mixtures thereof; more preferably zinc hydroxystannate or a mixture of zinc borate and magnesium hydroxide. Preferably the formulations of the present invention comprise from 1 to 40% by weight of the formulation of the smoke suppressant, more preferably from 2 to 38%, and even more preferably from 3 to 35%.

In a particular embodiment of the present invention, the formulations of the present invention comprise both an organic polymeric or oligomeric phosphorous containing fire retardant and a smoke suppressant.

In a preferred embodiment of the present invention, the formulations of the present invention further comprise an epoxy novolac resin. Preferably, the formulations of the present invention comprise from 5 to 30% by weight of the formulation of the epoxy novolac resin, more preferably from 6 to 25%, and even more preferably from 7.5 to 20%.

Preferably the epoxy novolac resin comprises a phenol epoxy novolac resin, a cresol epoxy novolac resin, a triphenylmethane epoxy novolac resin or mixtures thereof, more preferably the epoxy novolac resin comprises a phenol epoxy novolac resin.

In a further embodiment of the present invention, the formulations of the present invention further comprise an elastomeric toughener component, preferably an elastomeric toughener component comprising core shell elastomer particles and/or an elastomer/epoxy adduct.

The core shell elastomer used in the formulations of this invention is preferably a blend of a core shell elastomer particle in an epoxy resin. These materials generally include about 1:5 to 5:1 parts of epoxy to elastomer, and more preferably about 1:3 to 3:1 parts of epoxy to elastomer. More typically, the core shell elastomer includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. Preferably the wt % of the core shell particles in this blend is from 5 to 40 wt %, more preferably from 10 to 30 wt %.

The elastomer may be functionalized at either the main chain or the side chain. Suitable functional groups include, but are not limited to, —COOH, —NH$_2$, —NH—, —OH, —SH, —CONH$_2$, —CONH—, —NHCONH—, —NCO, —NCS, and oxirane or glycidyl group etc. The elastomer optionally may be vulcanizeable or post-crosslinkable. Exemplary elastomers include, without limitation, natural rubber, styene-butadiene rubber, polyisoprene, polyisobutylene, polybutadiene, isoprenebutadiene copolymer, neoprene, nitrile rubber, butadiene-acrylomitrile copolymer, butyl rubber, polysulfide elastomer, acrylic elastomer, acrylonitrile elastomers, silicone rubber, polysiloxanes, polyester rubber, disocyanatelinked condensation elastomer, EPDM (ethylene-propylene diene rubbers), chlorosulfonated polyethylene, fluorinated hydrocarbons, thermoplastic elastomers such as (AB) and (ABA) type of block copolymers of styrene and butadiene or isoprene, and (AB)n type of multi-segment block copolymers of polyurethane or polyester, and the like. In the case that carboxyl-terminated butadiene-acrylonitrile (CTBN) is used as the functionalized elastomer, the preferable nitrile content is from 5-35% by weight based on the resin composition, more preferably from 20-33% by weight based on the resin composition.

Preferably, the core shell elastomer particles comprise a rubber, more preferably the core shell elastomer particles comprise a silicone rubber.

Examples of core shell elastomers in admixture with an epoxy resin suitable for use in the compositions of the present invention are the MX range of products available from Kaneka, such as MX153, MX416 and MX965.

An example of a suitable epoxide-functionalized epoxy/core shell elastomer which is sold in admixture with an epoxy resin is the product with the trade name HyPox™ RK84, a bisphenol A epoxy resin blended with CTBN elastomer, and also the product with the trade name HyPox™ RA1340, an epoxy phenol novolac resin modified with CTBN elastomer, both commercially available from CVC Thermoset Specialities, Moorestown, N.J. In addition to bisphenol A epoxy resins, other epoxy resins can be used to prepare the epoxy/elastomer adduct, such as n-butyl glycidyl ether, styrene oxide and phenylglycidyl ether; bifunctional epoxy compounds such as bisphenol A diglycidyl ether, bisphenol F diglycidyl ether, bisphenol S diglycidyl ether and diglycideyl phthalate; trifunctional compounds such as triglycidyl isocyanurate, triglycidyl p-aminophenol; tetrafunctional compounds such as tetraglycidyl m-xylene diamine and tetraglycidyldiaminodiphenylmethane; and compounds having more functional groups such as cresol novolac polyglycidyl ether, phenol novolac polyglycidyl ether and so on.

When a blend of core shell elastomer particles and epoxy resin, and/or an elastomer/epoxy adduct in admixture with an epoxy resin, is used in the formulations of the present invention, the amount of toughener is expressed as the amount of the core shell elastomer particles and/or elastomer epoxy adduct present in the formulation not including the epoxy resin component. For example, a formulation comprising 20 wt % of a blend of core shell rubber particles in epoxy resin, in which the core shell rubber particles comprise 25% by weight of the blend, is considered to comprise 5% core shell elastomer particles by weight of the formulation.

Preferably, the formulations of the present invention comprise from 1 to 20% by weight of the formulation of the core shell elastomer particles and/or elastomer/epoxy adduct, more preferably from 2 to 15%, and even more preferably from 3 to 10%.

In a preferred embodiment of the present invention, the formulations of the present invention further comprise one or more bisphenol epoxy resins in addition to the halogenated epoxy resin. The one or more additional bisphenol epoxy resins may be added to the formulation as a specific additional component and/or may be derived from one or more of the other components added to the formulation. For example, some or all of the additional bisphenol epoxy resins may be present as part of a blend of core shell elastomer particles and epoxy resin added to the formulation, or as the carrier for an inorganic phosphorous containing fire retardant added to the formulation. The amount of additional bisphenol epoxy resin referred to herein is the total amount of additional bisphenol epoxy resins in the formulation (other than the halogenated epoxy resin) whatever the source, and may therefore include mixtures of different bishphenol epoxy resin. Preferably, the formulations of the present invention comprises from 1 to 40% by weight of the formulation of additional bisphenol epoxy resin, more preferably from 3 to 30%, and even more preferably from 3 to 25%.

Suitable additional bisphenol epoxy resins for use in the formulations of the present invention include polyfunctional resins, i.e. resins having a functionality of at least 2, and possibly 3 or 4. The additional bisphenol resins preferably have a high reactivity as indicated by an EEW in the range from 100 to 1500, preferably from 100 to 350, more preferably from 100 to 300, most preferably an EEW in the range of from 100 to 250 and/or combinations of the aforesaid ranges.

Suitable difunctional epoxy resins, by way of example, include those based on diglycidyl ether of bisphenol F, diglycidyl ether of bisphenol A, phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, aromatic glycidyl amines, heterocyclic glycidyl imidines and amides, glycidyl ethers, glycidyl esters or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N, N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), Araldite ECN 1299 and Araldite MY9512 (from Huntsman Advanced Materials).

Particularly preferred additional bisphenol epoxy resins for use in the formulations of the present invention include a diglycidyl ether of bisphenol A, a diglycidyl ether of bisphenol F, a multifunctional epoxy resin or mixtures thereof.

In a further embodiment of the present invention, the formulations of the present invention further comprise one or more thermoplastic toughening agents. Preferably, the formulations comprise from 1 to 15% by weight of the formulation of the one or more thermoplastic toughening agents, more preferably from 1 to 10%, and even more preferably from 2 to 8%.

Preferably the one or more thermoplastic toughening agents comprises a phenoxy resin, a polyvinyl butyral resin, a thermoplastic fluoropolymer, an ethylene vinyl acetate copolymer or a poly(aryl ether sulfone), more preferably the one or more thermoplastic toughening agents comprises a phenoxy resin.

A phenoxy resin is a thermoplastic polymer derived from bisphenol A, and is a polyhydroxyether, with ether linkages along the polymer backbone and pendant hydroxyl groups. One useful phenoxy resin is the reaction product of a phenol based difunctional epoxy resin and a difunctional phenol (for example the reaction product of bisphenol A epoxy with bisphenol A). A similar material may also be synthesized directly from a bisphenol (for example bisphenol A) and epichlorohydrin. The terminal epoxy group may be ring opened to generate a terminal alpha glycol group. The phenoxy resins typically have weight-average molecular weights of at least about 5,000, more typically at least about 25,000 and still more typically at least about 50,000 but less than about 100,000, more typically less than about 75,000 and still more typically less than about 60,000. Examples of useful phenoxy resins include PAPHEN Phenoxy Resin PKHH, PKHC, PKHB and PKHJ, from Gabriel Performance Products, and phenoxy resins available from Kukdo, such as Phenoxy YP50. Examples of suitable polyvinyl butyral resins include Butvar resins (available from Eastman Chemical Company, examples of suitable thermoplastic fluoropolymers include polyvinyl fluorides, examples of suitable ethylene vinyl acetate copolymers include Elvax polymers (available from DuPont), and examples of suitable poly(aryl ether sulfones) include polyethersulphones, polyphenylsulfones and polyethersulfone-ethersulfone copolymers.

In a particularly preferred embodiment of the present invention, the formulations according to the invention further comprise a wetting agent or mixture of wetting agents. Preferably the formulations of the invention comprise from 0.05 to 1.5% by weight of the formulation of wetting agents, more preferably from 0.075 to 1.0%, and even more preferably from 0.1 to 0.6% by weight of the formulation.

Wetting agents suitable for use in the formulations of the present invention include any materials that function to improve the wetting out of the resin when applied to a structural fibre component, such as compounds having a surfactant structure, preferably an ionic or non-ionic surfactant having a hydrocarbon chain as the non-polar component. Examples of suitable wetting agents for use in the formulations of the present invention include a non-ionic fluorinated polyether ethoxylated polymer, such as Polyfox PF-159, and a copolymer with acidic groups, such as BYK W 9010.

It is preferred that the formulations of this invention are solid at ambient temperature.

The formulations of the present invention may contain other additives, such as flexibilizers, impact modifiers, polymer or copolymer fillers, and other elongation promoting additives, wetting, flow and levelling agents, and anti-settling agents. Suitable flexibilizers include non-reactive flexibilizers, such as urethanes, and reactive flexibilizers (capable of extending the spacing between cross links in the cured resins), including silicone-epoxy resins, such as Silikopon® available from Evonic, and phenol terminated polyurethane adducts. Suitable levels of flexibilizers are from 3 to 20% by weight of the composition, preferably from 5 to 15%.

In a particular embodiment, the formulations of the present invention comprise:
a. from 15 to 60% by weight of the formulation of a halogenated epoxy resin;
b. from 5 to 30% by weight of the formulation of an organic polymeric or oligomeric phosphorous containing fire retardant;
c. from 3 to 20% by weight of the formulation of a curative system;
d. from 1.5 to 12% by weight of the formulation of an antimony based fire retardant;
e. from 1.5 to 7.5% by weight of the formulation of an inorganic or non-polymeric organic phosphorous containing fire retardant;
f. from 6 to 25% by weight of the formulation of an epoxy novolac resin;
g. from 2 to 15% by weight of the formulation of an elastomeric toughener component comprising core shell elastomer particles and/or an elastomer/epoxy adduct,
h. from 1 to 10% by weight of the formulation of one or more thermoplastic toughening agents; and
i. from 5 to 35% by weight of the formulation of one or more bisphenol epoxy resins in addition to the halogenated epoxy resin.

In a further embodiment, the formulations of the present invention comprise:
a. from 15 to 60% by weight of the formulation of a halogenated epoxy resin;
b. from 5 to 30% by weight of the formulation of an organic polymeric or oligomeric phosphorous containing fire retardant;
c. from 3 to 20% by weight of the formulation of a curative system;
d. from 1.5 to 12% by weight of the formulation of an antimony based fire retardant;
e. from 1.5 to 7.5% by weight of the formulation of an inorganic or non-polymeric organic phosphorous containing fire retardant;
f. from 6 to 25% by weight of the formulation of an epoxy novolac resin;
g. 2 to 15% by weight of the formulation of an elastomeric toughener component comprising core shell elastomer particles and/or an elastomer/epoxy adduct; and
h. from 5 to 35% by weight of the formulation of one or more bisphenol epoxy resins in addition to the halogenated epoxy resin.

In a further embodiment, the formulations of the present invention comprise:
a. from 15 to 60% by weight of the formulation of a halogenated epoxy resin;
b. from 5 to 30% by weight of the formulation of an organic polymeric or oligomeric phosphorous containing fire retardant;
c. from 3 to 20% by weight of the formulation of a curative system;
d. from 1.5 to 12% by weight of the formulation of an antimony based fire retardant;
e. from 1.5 to 7.5% by weight of the formulation of an inorganic or non-polymeric organic phosphorous containing fire retardant;
f. from 6 to 25% by weight of the formulation of an epoxy novolac resin;
g. 2 to 15% by weight of the formulation of an elastomeric toughener component comprising core shell elastomer particles and/or an elastomer/epoxy adduct;
h. from 1 to 10% by weight of the formulation of one or more thermoplastic toughening agents;
i. from 2 to 38% by weight of the composition of a smoke suppressant, and
j. from 5 to 35% by weight of the formulation of one or more bisphenol epoxy resins in addition to the halogenated epoxy resin.

In a further embodiment, the formulations of the present invention comprise:
a. from 15 to 60% by weight of the formulation of a halogenated epoxy resin;
b. from 3 to 20% by weight of the formulation of a curative system;
c. from 1.5 to 12% by weight of the formulation of an antimony based fire retardant;

d. from 1.5 to 7.5% by weight of the formulation of an inorganic or non-polymeric organic phosphorous containing fire retardant;
e. from 6 to 25% by weight of the formulation of an epoxy novolac resin;
f. from 1 to 10% by weight of the formulation of one or more thermoplastic toughening agents;
g. from 2 to 38% by weight of the composition of a smoke suppressant, and
h. from 5 to 35% by weight of the formulation of one or more bisphenol epoxy resins in addition to the halogenated epoxy resin.

In a further embodiment, the formulations of the present invention comprise:
a. from 15 to 60% by weight of the formulation of a halogenated epoxy resin;
b. from 5 to 30% by weight of the formulation of an organic polymeric or oligomeric phosphorous containing fire retardant;
c. from 3 to 20% by weight of the formulation of a curative system;
d. from 1.5 to 12% by weight of the formulation of an antimony based fire retardant;
e. from 1.5 to 7.5% by weight of the formulation of an inorganic or non-polymeric organic phosphorous containing fire retardant;
f. from 6 to 25% by weight of the formulation of an epoxy novolac resin;
g. from 1 to 10% by weight of the formulation of one or more thermoplastic toughening agents;
h. from 2 to 38% by weight of the composition of a smoke suppressant, and
i. from 5 to 35% by weight of the formulation of one or more bisphenol epoxy resins in addition to the halogenated epoxy resin.

In a further embodiment, the formulations of the present invention comprise:
a. from 15 to 60% by weight of the formulation of a halogenated epoxy resin;
b. from 5 to 30% by weight of the formulation of an organic polymeric or oligomeric phosphorous containing fire retardant;
c. from 3 to 20% by weight of the formulation of a curative system;
d. from 1.5 to 12% by weight of the formulation of an antimony based fire retardant;
e. from 1.5 to 7.5% by weight of the formulation of an inorganic or non-polymeric organic phosphorous containing fire retardant;
f. from 6 to 25% by weight of the formulation of an epoxy novolac resin;
g. from 1 to 10% by weight of the formulation of one or more thermoplastic toughening agents;
h. from 2 to 38% by weight of the composition of a smoke suppressant;
i. from 0.05 to 1.5% by weight of a wetting agent, and
j. from 5 to 35% by weight of the formulation of one or more bisphenol epoxy resins in addition to the halogenated epoxy resin.

In a further embodiment, the formulations of the present invention comprise:
a. from 15 to 60% by weight of the formulation of a halogenated epoxy resin;
b. from 5 to 30% by weight of the formulation of an organic polymeric or oligomeric phosphorous containing fire retardant;
c. from 3 to 20% by weight of the formulation of a curative system;
d. from 1.5 to 12% by weight of the formulation of an antimony based fire retardant;
e. from 1.5 to 7.5% by weight of the formulation of an inorganic or non-polymeric organic phosphorous containing fire retardant;
f. from 6 to 25% by weight of the formulation of an epoxy novolac resin;
g. from 2 to 38% by weight of the composition of a smoke suppressant;
h. from 0.05 to 1.5% by weight of a wetting agent, and
i. from 5 to 35% by weight of the formulation of one or more bisphenol epoxy resins in addition to the halogenated epoxy resin.

In particularly preferred embodiments of the present invention the total amounts of organic and inorganic components are balanced so as to provide good mechanical and processing characteristics whilst also providing excellent fire retarding, low smoke emission, low smoke toxicity and low heat release properties. In particular, the weight ratio of the sum of all of the epoxy resin components and any thermoplastic toughening agents to the sum of the inorganic phosphorous, antimony and any smoke suppressant components in the formulation is from 10:1 to 1:1, preferably from 5:1 to 1:1, more preferably from 2:1 to 1.5:1. By the sum of all of the epoxy resin components is meant the total amount of the halogenated epoxy resin component and any other epoxy resins, whether added directly to the formulation as an additional component or as a carrier for other components (such as for an inorganic phosphorous component or for a core shell rubber, etc.). Similarly, by the sum of the inorganic phosphorous, antimony and any smoke suppressant components is meant the absolute amounts of these components, i.e. excluding any carriers, etc.

In preferred embodiments of the present invention the formulations of the invention are curable in 30 minutes or less at 140° C. and in 15 minutes or less at 150° C. under autoclave curing using a 2° C. per minute ramp. Additionally or alternatively, the formulations of the present invention are curable in 15 minutes or less using a hot-load/hot-unload press cure at 160° C. and up to 7 bar pressure, i.e. a cure cycle in which the formulation or a prepreg comprising the formulation is placed in a pre-heated mould, pressed for the required time, and removed from the mould without a cooling step.

In further preferred embodiments, the formulations of the present invention have a dry Tg after curing of at least 130° C., preferably at least 145° C., and more preferably at least 150° C.

In preferred embodiments of the present invention the formulations of the present invention have a viscosity of no more than 10 $Pas^{-1}$ at 110° C., more preferably no more than 710 $Pas^{-1}$ at 110° C., most preferably no more than 210 $Pas^{-1}$ at 110° C.

The formulations of the present invention are particularly suitable for use as the matrix in a prepreg, and prepregs comprising reinforcement fibres and a formulation according to the present invention are also embodiments of this invention. The prepregs of this invention may contain any suitable reinforcement fibres, such as glass fibre, carbon fibre and/or aramid fibre, which may be woven, non-woven, unidirectional or multidirectional. Preferably, the reinforcement fibres are glass and/or carbon fibres. Where the fibres are carbon fibres they may be in the form of tows comprising multiple fibres or filaments, such as from 6,000 to 50,000 or more filaments per tow. Exemplary layers of unidirectional fibrous tows are made from HexTow® carbon fibres, which are available from Hexcel Corporation. Suitable HexTow® carbon fibres for use in making unidirectional fibre tows include: IM7 carbon fibres, which are available as tows that contain 6,000 or 12,000 filaments and weight 0.223 g/m and 0.446 g/m respectively; IM8-IM10 carbon fibres, which are available as tows that contain 12,000 filaments and weigh from 0.446 g/m to 0.324 g/m; and AS7 carbon fibres, which are available in tows that contain 12,000 filaments and weigh 0.800 g/m. Tows containing up to 50,000 (50K) filaments which may be used include those containing about 25,000 filaments available from Toray and those containing about 50,000 filaments available from Zoltek or Tenax. Specific examples of industrial fibres include T620 60E carbon fibres, which are available in tows containing 24,000 filaments from Toray, and STS40 F13 carbon fibres, which are available in tows containing 24,000 filaments and weight 1.6 g/m from Tenax The prepregs of the present invention may be formed in any convenient manner whereby the reinforcement fibres are at least partially impregnated with a formulation of the present invention, for example using the well-known "nip" arrangement or "S-wrap" arrangement.

Preferably, the prepregs of the present invention comprise from 25 to 70% by weight of the prepreg of the formulation of the present invention. For example, a prepreg of the present invention that is particularly suitable for the manufacture of aircraft seats comprises from 36 to 40 wt % of a formulation according to the present invention and from 64 to 60 wt % carbon fibre, and a prepreg of the present invention that is particularly suitable for the manufacture of aircraft galley or storage components (such as bins) comprises from 38 to 40 wt % of a formulation according to the present invention and from 62 to 60 wt % glass and/or carbon fibre.

In preferred embodiments of the prepregs of the present invention, the reinforcement fibres are carbon and the prepregs have, after curing, at least one of the following properties:
 a) interlaminar shear strength (ILSS) of at least 50 MPa, preferably at least 60 MPa, more preferably at least 70 MPa, as measured by ASTM D2344;
 b) 0° flexural strength of at least 1100 MPa, preferably at least 1400 MPa, more preferably at least 1600 MPa, as measured by ASTM D790;
 c) 0° flexural modulus of at least 95 GPa, preferably at least 100 GPa, more preferably at least 120 GPa, as measured by ASTM D790;
 d) 0° tensile strength of at least 1400 MPa, preferably at least 1600 MPa, more preferably at least 1900 MPa, as measured by ASTM D3039; or
 e) 0° tensile modulus of at least 110 GPa, preferably at least 115 GPa, more preferably at least 120 GPa, as measured by ASTM D3039.

In particularly preferred embodiments of the prepregs of the invention, the reinforcement fibre is carbon and the prepregs have at least 2 of the above properties, more preferably at least 3 of the above properties, even more preferably at least 4 of the above properties, and most preferably all of the above properties.

In a preferred embodiment of this invention the prepregs of the invention are laid-up with other layers of materials, which may be other composite materials (e.g. other prepregs according to the invention or other prepregs), to produce a prepreg stack which can be cured to produce a fibre reinforced laminate. The prepregs may also be bonded to other layered structures, such as honeycomb structures and metal foils, either before or after curing.

Laminar structures produced by curing prepregs of the present invention are particularly suitable for use as components in aircraft, such as seats or parts thereof, such as a seat pan, a seat back or a seat rest.

The invention is illustrated but in no way limited by the following Examples, in which the following formulations were prepared employing the following ingredients:
 LME 11082—a Bis C epoxy of EEW 205 from Hunstman.
 Phenoxy YP50P—a phenoxy resin toughener from Kukdo.
 Araldite GY281—a bisphenol F epoxy resin of EEW 159-172, available from Huntsman
 MX153—a core shell rubber (33 wt %) mixed with Bisphenol A epoxy resin of EEW 270 (67 wt %), available from Kaneka.
 Kaneka MX965—silicone core shell rubber (25 wt %) mixed with a bisphenol F epoxy Resin of EEW 220 (75 wt %) from Kaneka.
 Exolit RP6500—red phosphorus flame retardant (42-47 wt %) in a bisphenol A epoxy resin of EEW 180-190 (53-58 wt %) from Clariant.
 Exolit OP395—a 10% phosphinate based flame retardant from Clariant.
 Technicure ADH-J—Adipic Dihydrazide curative from Geniechem.
 Omicure U52M urea based accelerator from Alzchem.
 YD PN638—an epoxy phenol novolac resin from Kukdo EEW 170-190.
 Nofia OL 3001—a ground phosphorous oligomer from Velox.
 Antimony pentoxide from Chemisphere.
 Firebrake ZB—zinc borate from Borax.
 Magnifin H10—magnesium hydroxide from Martinswerk.
 Polyfox 159—A surface finishing/wetting agent available from Omnova Solutions.
 BYK-W 9010—a wetting agent available from BYK Additives & Instruments
 Araldite MY9512—a tetrafunctional epoxy resin of EEW 117-134, available from Huntsman.
 CHS-130T—a core shell rubber (30 wt %) in solid epoxy resin of EEW 800 (70 wt %), from Spolchemie.
 Araldite LY3581—a bishphenol F epoxy resin of EEW 160-170, from Huntsman.
 SCT 150—an epoxy phenol novolac of EEW 160-170, from Shin-A.
 DICY—Dyhard 100S micronized grade of dicyandiamide curative from AlzChem.
 Dyhard UR 505—bis urea curing agent from AlzChem.
 Dyhard D50EP—dicyandiamide (50 wt %) in bisphenol A epoxy resin (50 wt %)

EXAMPLES 1 AND 2, AND COMPARATIVE EXAMPLES 1 AND 2

The formulations for Examples 1 and 2 and Comparative Examples 1 and 2 are shown in Table 1. The formulations were prepared by dissolving the phenoxy YP50P (when used) at 130° C. in the resins, followed by the dissolution of Nofia OL3001 (when used) at 100° C. The formulations were cooled to 90° C. for the addition of Exolit RP6500 and the rest of the flame retardants (when used). The curatives were added between 60 and 65° C. The mixtures were made under continuous mixing.

TABLE 1

Formulations

| Raw Materials | Comparative Example 1 | Comparative Example 2 | Example 1 | Example 2 |
|---|---|---|---|---|
| MY9512 | 44.0 | | | |
| MX153 | 23.0 | | | |
| CHS-130T | 8.0 | | | |
| LME 11082 | | | 26.0 | 27.7 |
| YD PN638 | | 31.3 | 13.6 | 12.0 |
| Kaneka MX965 | | 38.6 | 25.0 | 20.0 |
| Phenoxy YP50P | 7.5 | 6.0 | 4.0 | |
| Nofia OL 3001 | | | 10.0 | 20.0 |
| Exolit RP6500 | 5.0 | 8.3 | 8.0 | 6.0 |
| Firebrake ZB | | 3.0 | | |
| Magnifin H10 | | 3.0 | | |
| Antimony Pentoxide | | | 4.0 | 6.0 |
| Technicure ADH-J | 6.5 | 5.1 | 4.9 | 4.3 |
| Omicure U52M | 6.0 | 4.7 | 4.5 | 4.0 |
| Total | 100.0 | 100.0 | 100.0 | 100.0 |

The formulations of Examples 1 and 2 both had a post cured Tg of 134° C.

The formulations were prepregged by the hot melt route, where the resins are coated into two films used to consolidate a carbon fibre tape Panels were formed by prepregging the formulations of Examples 1 and 2 on various fibres for FST/OSU and mechanical screening and were cured in an autoclave with 2° C./min for 45 minutes at 150° C. and 7 bar pressure. No peel plies were used on the surfaces of the laminates. Panels comprising the formulations of Comparative Examples 1 and 2 prepregged onto various fibres were cured in an autoclave with 2° C./min for 45 minutes at 130° C. and 7 bars. The FST/OSU panels and the panels for mechanical screening (apart from ILSS testing) were cured with peel plies. The results are shown in Tables 2 and 3.

Both the formulations of Example 1 and Example 2 prepregged on AS7 carbon fibre at 194 gsm FAW (available from Hexcel Corporation, USA) at 36% resin content (RC) pass the heat release FAR25.853 requirements and the ABD0031 smoke density requirements in flaming mode for 3 mm thick monolithic laminates, (0/90) ns lay-up (see Table 2). The formulations have better FST/OSU performance compared to Comparative Example 1 (a commercial products), which fails the heat release and smoke density requirements when prepregged onto carbon fibre AS4 at 160 gsm (available from Hexcel corporation, USA) at a lower resin content (34%). The formulations of Examples 1 and 2 also perform better than the formulation of Comparative Example 2 (a further commercial product) in heat release testing when prepregged on the same carbon fibre (AS7 at 194 gsm) and the same resin content (36%).

TABLE 2

FST/OSU results

| | | OSU Test specification ASTM E906 | | NBS Ds |
|---|---|---|---|---|
| System | Thickness (mm) | Peak HRR (kW/m2) Avg | Total HRR (kWmin/m2) Avg | Max in 4 min (Flaming mode) Test specification FAR 25.853 |
| Comparative Example 1 at 34% on AS4/160 gsm | 3 | 91.8 | 71.3 | 181 |
| Comparative Example 2 at 36% on AS7/194 gsm | 3 | 129.9 | 67.9 | 41 |
| Example 1 at 36% on AS7/194 gsm | 3 | 32 | 21 | 48.4 |
| Example 2 at 36% on AS7/194 gsm | 3 | 29 | 24.5 | 131 |
| Requirements | | 65 | 65 | 150 |

Example 1 and Example 2 prepregs also pass the heat release and smoke density for 1 mm and 5 mm, (0/90) ns panels (results in Table 3)

TABLE 3

FST/OSU results for Examples 1 and 2

| | | OSU ASTM E906 | | NBS Ds |
|---|---|---|---|---|
| System | Thickness (mm) | Peak HRR (kW/m2) Avg | Total HRR (kWmin/m2) Avg | Max in 4 min (Flaming mode) Test specification FAR 25.853 |
| Example 1 at 36% on AS7/194 gsm | 1 | 27.7 | 24.7 | 106.2 |
| Example 2 at 36% on AS7/194 gsm | 1 | 42.4 | 27.2 | 88.3 |
| Example 1 at 36% on AS7/194 gsm | 5 | 45.8 | 9.5 | 31 |
| Example 2 at 36% on AS7/194 gsm | 5 | 37.3 | 14.8 | 50.4 |
| Requirements | | 65 | 65 | 150 |

Without wishing to be bound by theory, it is believed that the improved heat release performance without compromising the smoke density is due to phosphorus and halogenated flame retardants which act independently and additively. Both phosphorus and halogenated flame retardants act in the gas phase in a similar way by removing the H. and OH. radicals from flammable gases. The phosphonate oligomer (OL3001 with 10% P) and red phosphorus (43-47% in Exolit RP6500) are char-forming flame retardant primarily active in the condensed phase. Heated phosphorus will react to form a polymeric phosphoric acid creating an insulating char layer.

The mechanical results for Examples 1 and 2 are presented in the Table 4 in comparison with Comparative Examples 1 and 2.

TABLE 4

Mechanical data

| Prepreg | ILSS (Mpa) EN2563 | Flex Strength (Mpa) EN2562 | Flex Mod (GPa) EN2562 | IPSS (MPa) AITM 1.0002 | IPSM (GPa) AITM 1.0002 |
|---|---|---|---|---|---|
| Example 1 at 36% on AS7 at 194 gsm | 77 | 1285 | 121.5 | 96 | 3.6 |
| Example 2 at 36% on AS7 at 194 gsm | 72 | 1336 | 123.7 | 95 | 4.14 |
| Comparative Example 1 at 34% on AS7 at 160 gsm | 74 | 1235 | 111 | 84 | 3.3 |
| Comparative Example 2 at 36% on AS7 at 194 gsm | 70 | 1330 | 116.8 | 71 | 3.45 |

ILSS (Inter laminar shear strength) and flexural data for Example 1 and Example 2 was comparable with Comparative Examples 1 and 2 but higher IPSS/IPSM value were observed.

EXAMPLES 3, 4 AND 5

The formulations for Examples 3, 4 and 5 are shown in Table 5.

TABLE 5

Examples 3, 4 and 5

| Raw Materials | Example 3 | Example 4 | Example 5 |
|---|---|---|---|
| LME 11082 | 23.7 | 23.3 | 21.9 |
| Kaneka MX965 | 18.3 | | |
| LY3581 | | 13.5 | 12.0 |
| SCT 150 | 17.0 | 16.7 | 14.0 |
| Phenoxy YP50P | 3.7 | 5.7 | 3.0 |
| Nofia OL 3001 | 9.2 | | 8.0 |
| Exolit RP6500 | 7.3 | 7.2 | 6.0 |
| Firebrake ZB | 3.0 | 9.5 | 12.0 |
| Magnifin H10 | 3.0 | 9.5 | 12.0 |
| Antimony Pentoxide | 5.0 | 4.9 | 4.0 |
| DICY | 6.5 | 6.4 | 5.0 |
| Dyhard UR 505 | | | 2.0 |
| Polyfox 159 | 0.1 | 0.1 | 0.1 |
| Omicure U52M | 3.2 | 3.2 | |
| Total | 100.0 | 100.0 | 100.0 |

Examples 3, 4 and 5 were mixed in a similar way to Examples 1 and 2, where the resins were firstly melted at 100° C., then phenoxy was added and melted under mixing at 130° C. The mixture was cooled to 100° C. for the dissolution of Nofia OL3001 (where used). The flame retardants were added at 90° C. and the curatives between 60 and 65° C. The mixtures were made under continuous mixing.

The formulations of examples 3, 4 and 5 had post cure Tgs of 140° C., 160° C. and 163° C. respectively. All 3 resins were found to be suitable for hot load/hot unload press curing at 140° C. for 15 minutes.

The formulations were prepregged by the hot melt route, where the resins are coated into two films used to consolidate a UD Toray T620 60 E carbon fibre tape, a UD carbon tape and a glass fabric.

The OSU and smoke density results for 1, 3 and 5 mm, (0/90) ns panels cured in an autoclave (cure cycle: 2° C. per minute to 150° C. for 45 minutes at 7 bar) are presented in Table 6. Example 3 prepreg at 36% resin content on carbon UD passes heat release, smoke density and vertical burn 12 secs and 60 secs tests. On glass fabric the formulation of Example 3 passes heat release, smoke density and vertical burn tests for 1 mm thick panels.

The vertical burn results are presented in Tables 7 and 8.

TABLE 6

FST/OSU Results

| Material | Batch | Thickness (mm) | OSU (PHR (kW/m$^2$)) ASTM E906 | OSU (THR (2 min. kWmin/m$^2$)) ASTM E906 | NBS (DS. Max, 4 min) Flaming Mode ABD0031 (ATS 1000.001) |
|---|---|---|---|---|---|
| Example 3 at 36% on 300/Toray T620 | 3002 | 1 | 41 | 27 | 59 |
| Example 3 at 36% on 300/T620 | 3002 | 3 | 34 | 16 | 42 |
| Example 3 at 36% on 300/UD carbon | 3002 | 5 | 33 | 4 | 12 |
| Example 3 at 37% on 7781 glass | 3003 | 1 | 32 | 27 | 71 |
| FAR 25.853/ABD0031 | Requirements | | 65 kW/m$^2$ | 65 kWmin/m$^2$ | 150 Ds Max in 4 mins |

TABLE 7

Vertical burn test 12 secs and 60 secs for Example 3 on UD carbon, specification FAR 25.853 (a) Amdt 20, App. F Pt I(a)

| Test | Thickness (mm) | After flame secs Avg | Burn length (mm) Avg | Drip time (mm) Avg |
|---|---|---|---|---|
| VB 12 secs | 3 | 0 | 0 | 0 |
| VB 60 secs | 3 | 0 | 21 | 0 |
| VB 12 secs | 1 | 0 | 15 | 0 |
| VB 60 secs | 1 | 8.1 | 41 | 0 |
| VB 12 secs | 5 | 0 | 0 | 0 |
| VB 60 secs | 5 | 0 | 10 | 0 |
| VB 12 sec Requirements | | 15 | 203 | 5 |
| VB 60 secs requirements | | 15 | 152 | 3 |

TABLE 8

Vertical burn data 12 secs and 60 secs Example 3 on glass fibre, FAR 25.853 (a) Amdt 20, App. F Pt I(a)

| Test | Thickness (mm) | after flame secs Avg | Burn length (mm) Avg | Drip time (mm) Avg |
|---|---|---|---|---|
| VB 12 secs | 1 | 4.9 | 17 | 0 |
| VB 60 secs | 1 | 2.4 | 76 | 0 |
| VB 12 sec Requirements | | 15 | 203 | 5 |
| VB 60 secs requirements | | 15 | 152 | 3 |

FST, vertical burn at 12 seconds and 60 seconds data for Examples 4 and 5 is presented in Table 9. The prepregs were made on glass fibre by hot melt impregnation at 40% resin content. The formulations pass vertical burn requirements for 1 mm, 3 mm and 5 mm panels.

TABLE 9

Vertical burn results at 12 and 60 seconds for Examples 4 and 5.

| Prepreg description | Specimen thickness (mm) | VB 12 secs FAR 25.853 (a) Amdt 20, App. F Pt I(a) | | | VB 60 secs FAR 25.853 (a) App. F Pt I(a) Amdt 20, | | |
|---|---|---|---|---|---|---|---|
| | | After flame time (secs) | Burn distance (mm) | Drip time I(secs) | After flame time (secs) | Burn distance (mm) | Drip time I(secs) |
| Example 4 at 40% on 300 glass fabric | 1 | 8.5 | 50 | 0 | 0.3 | 49 | 0 |
| | 3 | 0 | 3 | 0 | 10.6 | 29 | 0 |
| | 5 | 0 | 3 | 0 | 14.9 | 14 | 0 |
| Example 5 at 40% on 300 glass fabric | 1 | 1.6 | 14 | 0 | 1.2 | 52 | 0 |
| | 3 | 0 | 2.9 | 0 | 6.2 | 27.8 | 0 |
| | 5 | 0 | 2.3 | 0 | 0 | 16.2 | 0 |
| Requirement | | 15 | 203 | 5 | 15 | 152 | 3 |

FST smoke density results for Examples 4 and 5 prepregged as above is shown in Table 10. The formulation of Example 4 at 40% resin content on glass passes the NBS smoke density test in flaming mode Ds Max 150 (FAR 25.853 target) and Ds Max 200 (ABD0031 target) for 1 mm, 3 mm and 5 mm panels. The formulation of Example 5 at 40% resin content passes Ds Max 200

TABLE 10

Smoke density - Examples 4 and 5

| Prepreg | Specimen thickness (mm) | NBS Ds Max in 4 min (Flaming mode) Avg FAR 25.853 PtV//ABD0031 (ATS 1000.001) |
|---|---|---|
| Example 4 at 40% on 300 glass | 1 | 111.18 |
| | 3 | 84.08 |
| | 5 | 54.93 |
| Example 5 at 40% on 300 glass | 1 | 96.51 |
| | 3 | 184.26 |
| | 5 | 167.18 |
| Requirements ABD 0031 Iss F | | 150 |
| Requirements FAR 25.853 Pt V | | 200 |

OSU heat release data for Examples 4 and 5 is shown in Table 11 below. The formulations at 40% resin content on glass pass the FAR 25.853 Pt. IV peak heat release 65 kW/m$^2$ and total heat release 65 kWmin/m$^2$ requirements.

TABLE 11

OSU heat release - Examples 4 and 5

| Designation | Specimen thickness (mm) | PHR Avg | THR Avg |
|---|---|---|---|
| Example 4 at 40% on 300 glass | 1 | 45.8 | 30.6 |
| | 3 | 56.6 | 2.16 |
| | 5 | 41.7 | 1.1 |
| Example 5 at 40% on 300 glass | 1 | 31.7 | 18.13 |
| | 3 | 19.9 | 1.83 |
| | 5 | 30.7 | 0.13 |
| Requirements FAR 25.853 Pt IV | | 65 | 65 |

EXAMPLE 6

The formulation of Example 6 is shown in Table 12

TABLE 12

Formulation

| Raw Material | % wt |
|---|---|
| LME 11082 | 20.19% |
| Araldite GY281 | 6.16% |
| SCT150 | 14.45% |
| Phenoxy YP50P | 3.11% |
| Polyfox 159 | 0.59% |
| Exolit RP 6500 | 6.22% |
| Nofia OL 3001 | 7.02% |
| Antimony Pentoxide | 4.24% |
| Firebrake ZB | 12.41% |
| Magnifin H10 | 12.41% |
| D50 EP | 10.99% |
| Dyhard UR505 | 2.22% |
| Total | 100% |

The formulation of Example 6 was prepared in a similar manner to the formulations of Examples 1 to 5. The formulation had a post cure Tg of 156° C. and a viscosity of 6.7 Pas$^{-1}$ at 110° C. The resin was suitable for hot load/hot unload press curing at 140° C. for 15 minutes.

Panels were prepared by prepregging the formulation of Example 6 on 24 k standard modulus carbon fibre (Tenax STS40) at 39.5% resin content at a FAW of 300 gsm. The panels were cured in an autoclave with 2° C./minute ramp to 150° C. for 45 minutes at 7 bar.

Mechanical data for the panels of Example 6 is given in Table 13.

TABLE 13

Mechanical data

| | | Example 6 | |
|---|---|---|---|
| Test | Method | Mean | Min |
| ILSS (MPa) | EN2563 | 91 | 83 |
| Flexural strength (MPa) | EN2562 | 1705 | 1646 |
| Flexural modulus (GPa) | | 118 | 116 |
| 0° Tensile Strength (MPa) | EN2561 | 1818 | 1729 |
| 0° Tensile Modulus (GPa) | | 129 | 122 |
| 0° Compression Strength (MPa) | EN2580B | 1550 | 1489 |
| 0° Compression Modulus (GPa) | | 109 | 107 |

The results in Table 13 clearly show that the panels of Example 6 had excellent mechanical properties.

Heat release data for the panels of Example 6 at various thicknesses is shown in Table 14.

TABLE 14

Heat release data (OSU)

| | | OSU Heat release Avg | |
|---|---|---|---|
| | Thickness (mm) | THR (kWmin/m$^2$) | PHR (kW/m$^2$) |
| Example 6 | 1 | 2 | 12 |
| | 3 | 7 | 39 |
| | 5 | 0 | 14 |
| FAR 25.853 Pt IV | | 65 | 65 |

Vertical burn data for the panels of Example 6 at various thicknesses is shown in Table 15.

TABLE 15

Vertical burn data (FST)

| | | | VB 12 secs Avg | | | VB 60 secs Avg | | |
|---|---|---|---|---|---|---|---|---|
| | Actual RC % | Thickness (mm) | After Flame (sec) | Burn length (mm) | Drip time (sec) | After Flame (sec) | Burn length (mm) | Drip time (sec) |
| Example 6 | 39.5 | 0.63 | 3 | 30 | 0 | 0 | 41 | 0 |
| | | 1 | 3 | 7 | 0 | 0 | 31 | 0 |
| | | 3 | 0 | 3 | 0 | 9 | 22 | 0 |
| | | 5 | 0 | 2 | 0 | 0 | 9 | 0 |
| FAR 25.853 Pt.I | | | 15 | 203 | 5 | 15 | 153 | 3 |

Smoke density data for the panels of Example 6 at various thicknesses is shown in Table 16.

TABLE 16

Smoke density data (FST)

| | Thickness (mm) | NBS Smoke Density (DsMax in 4 mins) in Flaming Mode |
|---|---|---|
| Example 6 | 1 | 40 |
| | 3 | 54 |
| | 5 | 69 |
| FAR 25.853 Pt V | | 200 |

The results in Tables 14, 15 and 16 show that the formulation of Example 6 provides panels having excellent heat release, vertical burn and smoke density properties, in all cases easily passing industry standard tests whilst also providing excellent mechanical properties (see Table 13). The formulation also provided excellent post cure Tg and had useful curing characteristics.

EXAMPLE 7

The formulation of Example 7 is shown in Table 17.

The formulation of Example 7 was prepared in a similar manner to the formulations of Examples 1 to 6.

TABLE 17

| Formulation | |
|---|---|
| Raw Material | % Wt |
| LME 11082 | 20.2 |
| Araldite GY281 | 10.2 |
| SCT150 | 14.5 |
| BYK 9010 | 0.5 |
| Exolit RP 6500 | 6.2 |
| Nofia OL 3001 | 7.0 |
| Antimony Pentoxide | 4.2 |
| Firebrake ZB | 12.0 |
| Magnifin H10 | 12.0 |
| D50 EP | 11.0 |
| Dyhard UR505 | 2.2 |
| Total | 100.0 |

The formulation had a post cure Tg of 154° C. and a viscosity of 1.3 Pas$^{-1}$ at 110° C. The resin had high tack and good flow properties, and was suitable for hot load/hot unload press curing at 140° C. for 15 minutes.

Panels were prepared by prepregging the formulation of Example 7 on 24 k standard modulus carbon fibre (Tenax STS40) at 38.4% resin content at a FAW of 300 gsm. The panels were cured in an autoclave with 2° C./minute ramp to 150° C. for 45 minutes at 7 bar and tested in the same manner as the panela of example 6.

Mechanical data for the panels of Example 7 is given in Table 18.

TABLE 18

| Mechanical data | | |
|---|---|---|
| | Example 7 | |
| Test | Mean | Min |
| ILSS (MPa) | 84.7 | 73 |
| Flexural Strength (MPa) | 1602 | 1510 |
| Flexural Modulus (GPa) | 120 | 118 |

The results in Table 18 clearly show that the panels of Example 7 had excellent mechanical properties.

Heat release data for the panels of Example 7 at various thicknesses is shown in Table 19.

TABLE 19

| Heat release data (OSU) | | | |
|---|---|---|---|
| OSU Heat release data for 1955-1 | | | |
| | | OSU Heat release Avg | |
| | Thick (mm) | THR (kWmin/m$^2$) | PHR (kW/m$^2$) |
| Example 7 | 1 | 45.5 | 42.9 |
| | 3 | 20.8 | 29.5 |
| | 5 | 22.6 | 50.5 |
| FAR 25.853 Pt IV | | 65 | 65 |

Smoke density data for the panels of Example 7 at various thicknesses is shown in Table 20.

TABLE 20

| Smoke density data (FST) | | |
|---|---|---|
| | Thick (mm) | Ds Max in 4 mins Flaming mode Avg |
| Example 7 | 1 | 109.2 |
| | 3 | 142.7 |
| | 5 | 108.9 |
| FAR 25.853 Pt V | | 200 |

The results in Tables 19 and 20 show that the formulation of Example 7 provides panels having excellent heat release and smoke density properties, in all cases easily passing industry standard tests whilst also providing excellent mechanical properties (see Table 18). The formulation also provided excellent post cure Tg and had useful curing characteristics, plus useful viscosity and tack.

The invention claimed is:
1. A polymeric resin formulation comprising:
   a. from 15 to 60% by weight of a halogenated epoxy resin;
   b. from 5 to 30% by weight of an organic polymeric or oligomeric phosphorous containing fire retardant;
   c. from 3 to 20% by weight of a curative system;
   d. from 1.5 to 12% by weight of an antimony based fire retardant;
   e. from 1.5 to 7.5% by weight of an inorganic or non-polymeric organic phosphorous containing fire retardant;
   f. from 6 to 25% by weight of an epoxy novolac resin;
   g. from 1 to 10% by weight of one ore more thermoplastic toughening agents;
   h. from 2 to 38% by weight of a smoke suppressant;
   i. from 0.05 to 1.5% by weight of a wetting agent, and
   j. from 5 to 35% by weight of one or more bisphenol epoxy resins in addition to the halogenated epoxy resin.
2. The formulation according to claim 1, having a cured dry Tg of at least 145° C.
3. The formulation according to claim 1, having a viscosity of no more than 10 PaS−1 at 110° C.
4. A prepreg comprising a fibrous reinforcement and the polymeric resin formulation of claim 1.
5. The prepreg as claimed in claim 4, wherein the reinforcement fibres are carbon and said prepreg having, after curing, at least one of the following properties:
   a) interlaminar shear strength (ILSS) of at least 50 MPa as measured by ASTM D2344;
   b) 0° flexural strength of at least 1100 MPa as measured by ASTM D790;
   c) 0° flexural modulus of at least 95 GPa as measured by ASTM D790;

d) 0° tensile strength of at least 1400 MPa as measured by ASTM D3039; or
e) 0° tensile modulus of at least 110 GPa as measured by ASTM D3039.

* * * * *